United States Patent [19]

Jones et al.

[11] 3,872,404

[45] Mar. 18, 1975

[54] SQUARE WAVE TRANSISTOR RELAXATION OSCILLATOR

[75] Inventors: Christopher Robin Jones, Solihull; Malcolm Williams, Somerset; Geoffrey Albert Kenyon Brunt, Alcester, all of England

[73] Assignee: C.A.V. Limited, Birmingham, England

[22] Filed: Apr. 4, 1973

[21] Appl. No.: 347,723

[30] Foreign Application Priority Data

Apr. 4, 1972 United Kingdom ............ 15342/72
Apr. 4, 1972 United Kingdom ............ 15343/72

[52] U.S. Cl. .............. 331/111, 123/32 EA, 323/51, 331/143

[51] Int. Cl. .......................................... H03k 3/28

[58] Field of Search......... 331/111, 113 R, 143, 144

[56] References Cited

UNITED STATES PATENTS

| | | | |
|---|---|---|---|
| 3,156,875 | 11/1964 | Fiorino et al. | 331/111 |
| 3,742,384 | 6/1973 | Breitzmann et al. | 331/143 X |

*Primary Examiner*—Siegfried H. Grimm
*Attorney, Agent, or Firm*—Holman & Stern

[57] ABSTRACT

A control system, particularly for a diesel engine, has a square wave oscillator, the output from which is fed to the primary winding of a transformer having a secondary winding, the coupling between the windings being varied to vary the output of the secondary winding. This signal can provide an input to a control circuit for determining the fuel supply to the engine, or can be used for other purposes.

5 Claims, 7 Drawing Figures

SQUARE WAVE TRANSISTOR RELAXATION OSCILLATOR

This invention relates to control systems, and to square wave oscillators for use therein.

In one aspect, the invention resides in a control system, comprising in combination a square wave oscillator, a transformer having a primary winding connected to the oscillator and a secondary winding, and means for varying the coupling between the primary and secondary windings whereby a variable output will be obtained in accordance with the setting of said means.

Preferably a demodulator is provided to provide a d.c. output signal.

Preferably said d.c. output signal is applied to a control circuit for controlling the movement of an actuator.

In another aspect, the invention resides in a square wave oscillator which is driven between a first state and a second state and which includes a first and second d.c. supply lines, a third supply line which is maintained at a potential between the potential of the first and second supply lines, a resistor-capacitor network, and switch means which when the oscillator is in one state connects the resistor-capacitor network between the third and first supply lines to determine the period for which the oscillator remains in said one state, the switch means serving when the oscillator is driven to its second state to connect the resistor-capacitor network between the third and second supply lines to determine the period for which the oscillator remains in its second state.

Preferably, the third supply line is at a potential midway between the potentials of the first and second supply lines.

Preferably, the oscillator supplies a signal to a variable coupling transformer, the output of the transformer being demodulated to provide a d.c. output signal, the magnitude of the output signal being indicative of the setting of the means which effects variation in the coupling of the transformer.

In the accompanying drawings.

Figures 1, 2:
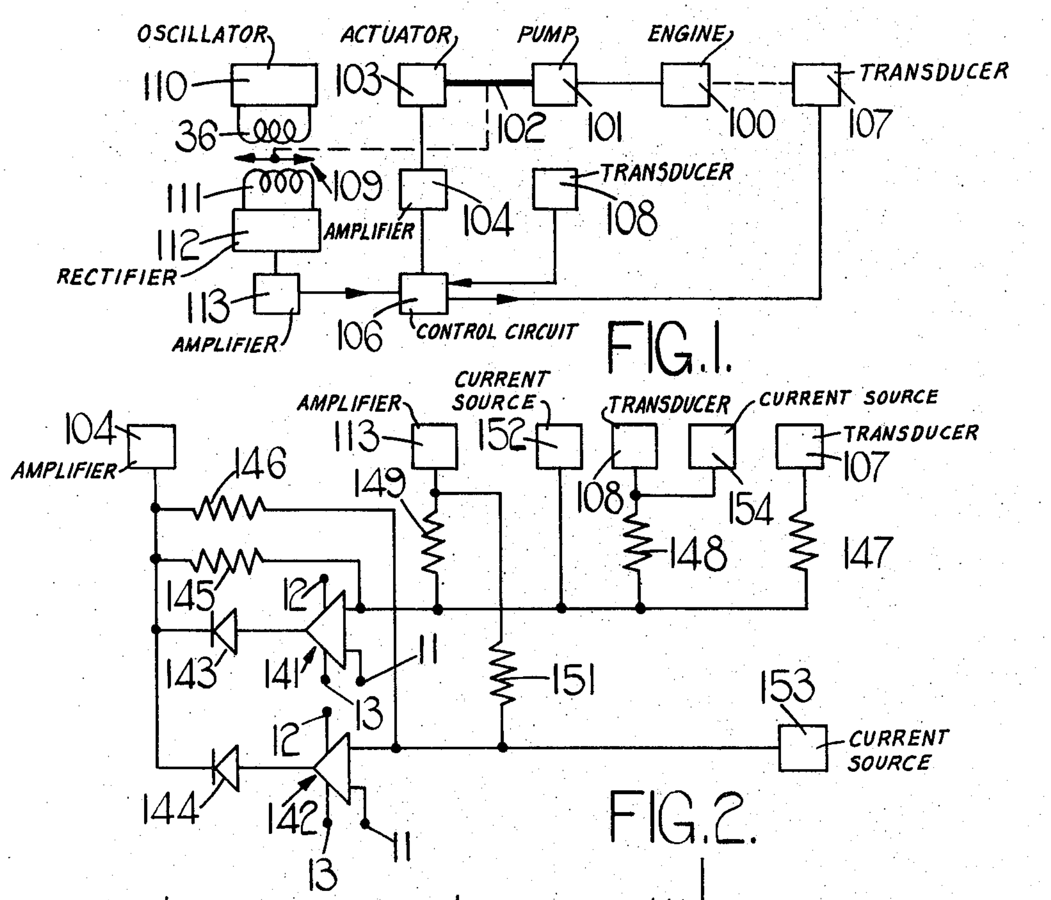
FIG. 1 is a block diagram illustrating one example of the invention.
FIG. 2 illustrates one form of control circuit for use in FIG. 1, FIGS. 3 to 5 illustrate the outputs of three transducer used in FIG. 2.

Referring to FIG. 1, a pump 101 supplies fuel to an engine 100, the output of the pump 101 being determined by the position of a control rod 102. The control rod 102 is itself controlled by an electro-mechanical actuator 103, which receives an input from an amplifier 104. The amplifier 104 receives an input from a control circuit 106, to which three input signals are applied. One input signal is from a transducer 108 and represents manually controlled demand. Where the engine drives a road vehicle, the output of the transducer 108 is determined by the setting of the accelerator pedal. A second input is from a transducer 107, and represents engine speed, and a third input represents the output of the pump 101. The control circuit 106 compares the three signals it receives, and provides an output to the amplifier 104 to determine the output of the pump 101.

In order to provide the signal representing pump output, there is provided a square wave oscillator 110 which provides an output to the primary winding 36 of a transformer 109. The transformer 109 has a secondary winding 111, and a part of the transformer is movable and coupled to the control rod 102, the arrangement being such that the coupling between the windings 36, 111 is dependent upon the position of the control rod 102, and thus upon the pump output. As a result, the amplitude of the signal in the winding 111 represents pump output, and this signal is fed through a full wave rectifier 112 and amplifier 113 to the control circuit 106. The rectifier 112 can be replaced by any other convenient demodulator.

FIG. 2 shows one form of the control circuit 106 seen in FIG. 1. The control circuit includes a pair of operational amplifiers 141, 142 having their output terminals connected through diodes 143, 144 respectively to the amplifier 104. Each of the amplifiers 141, 142 is connected between positive and negative lines 12, 13, and the non-inverting inputs of the amplifiers 141, 142 are connected to a line 11 at a potential midway between the potentials of the lines 12, 13. The amplifiers are connected to act as summing amplifiers, and for this purpose resistors 145, 146 are connected between the input of the amplifier 104 and the inverting inputs of the amplifiers 141, 142. The purpose of coupling the feedback resistors 145, 146 to the input of the amplifier 104 is so that the temperature characteristics of the diodes 143, 144 do not substantially affect the operation of the circuit.

Figure 3:
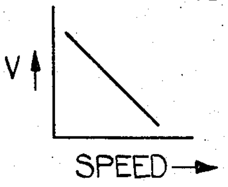
Figure 4:
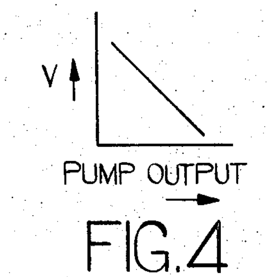
Figure 5:
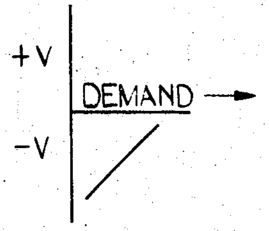

In FIGS. 3 to 5, the origin is the potential of the line 11. The transducer 107 produces a voltage output of the form shown in FIG. 3, and is coupled to the inverting input of the amplifier 141 through a resistor 147. The transducer 108 produces an output voltage of the form shown in FIG. 5, and this output is coupled to the inverting input of the amplifier 141 through a resistor 148. The output from the amplifier 113 is a voltage of the form shown in FIG. 4, and this output is coupled through resistors 149, 151 to the inverting inputs to the amplifiers 141, 142 respectively. There are also provided two current sources 152, 153 coupled to the inverting inputs of the amplifiers 141, 142 respectively for a purpose to be explained, and a control 154 which is coupled to the transducer 108.

Figure 6:
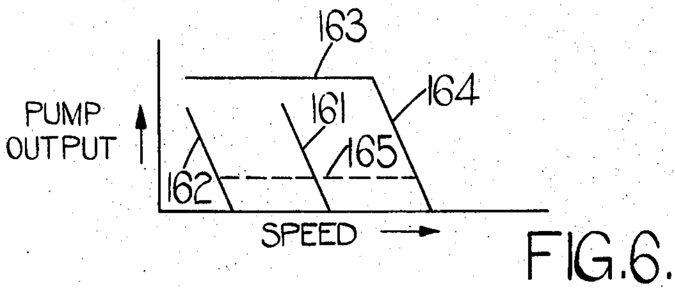
FIG. 6 is a graph showing the operating characteristics of the engine.

The operation of the arrangement shown in FIG. 2 is best explained with reference to FIG. 6. Ignoring for the moment the amplifier 142, the amplifier 141 compares the current flowing through the resistors 149 and 147 with the current flowing through the resistors 148, and produces an output to the amplifier 104 which modifies the fuel flow to give the required engine characteristics. The line 161 in FIG. 6 is one of a family of lines representing demanded engine speed. Thus, if the pedal is set in a position such that the demand is indicated by the line 161, then the engine will operate at a point on the line 161 determined by the load on the engine.

The purpose of the amplifier 142 is to restrict the maximum pump output to a predetermined value, indicated in FIG. 6 by the line 163. When the amplifier 141 is producing an output to operate the amplifier 104, the diode 144 is reverse biased. However, as the amplifier 141 demands more fuel, its output decreases, because the circuit is so arranged that smaller output from the amplifier 141 represents a demand for more fuel. The output from the amplifier 142 is determined by the current source 153, which sets the line 163. When the output from the amplifier 141 falls to a value such that it is smaller than the output from the amplifier 142, then the diode 144 starts to conduct, and reverse biases the diode 143. The amplifier 142 now controls the amplifier 104, so that the maximum pump output is restricted to the line 163 shown in FIG. 6.

The boundary line 165 shown dotted in FIG. 6 is a function of the engine, not the governor, and represents the no-load fuel requirements of the engine under different demands. The maximum speed line 164 is set by the control 154, and the minimum speed line 162 is set by the source 152.

It will be appreciated that FIG. 6 explains how the engine will behave in any circumastances. Suppose that the pedal has been set to demand represented by the line 161. As previously explained, the exact position on the line 161 at any given instant will depend on the load on the engine. Thus, if the vehicle starts to go up an incline, the load will increase, and if the pedal is not moved, the operating point will move up the line 161. If the load becomes sufficiently great, the line 163 is reached, and no further increase in pump output is permitted. At this point the speed falls rapidly. If the load decreases, then the operating point moves down the line 161 with corresponding increase in speed. If the load decreases to zero, the line 165 is reached.

If the demand is changed, then assuming for convenience that maximum demand is called for, the pump output will increase as rapidly as the pump and governor will allow until the line 163 is reached, and the engine will then move along the lines 163, 164 to a point on the line 164 determined by load. If the demand is reduced, for example to zero, then the pump output will decrease as rapidly as the pump and governor will allow until the fuel supply is zero. The speed then decreases until the line 162 is reached, and the operating point settles on the line 162 at a position determined by load.

It will of course be appreciated that the control circuit can take a variety of forms. In another example, the transducer 108 demands a particular fuel, rather than a particular speed. In such an arrangement, the line 161 extends horizontally in FIG. 6. The circuit of FIG. 2 can be employed in such an arrangement with suitable modifications. Thus, the transducer 107 now provides an input to the amplifier 142, but not to the amplifier 141. The input to the amplifier 142 from the transducer 107 enables the amplifier 142 to set the line 164. It will be appreciated that the slope on the line 164 is obtained by virtue of the input to the amplifier 142 by way of the resistor 151. The amplifier 141 now compares demanded fuel with actual fuel and produces the required horizontal line replacing the line 161 in FIG. 6. The control 154 now limits the maximum demand and so produces the line 163, and the control 152 produces the line 162. However, because the line 162 has a slope, the controls 152, 154 now require speed terms.

Figure 7:
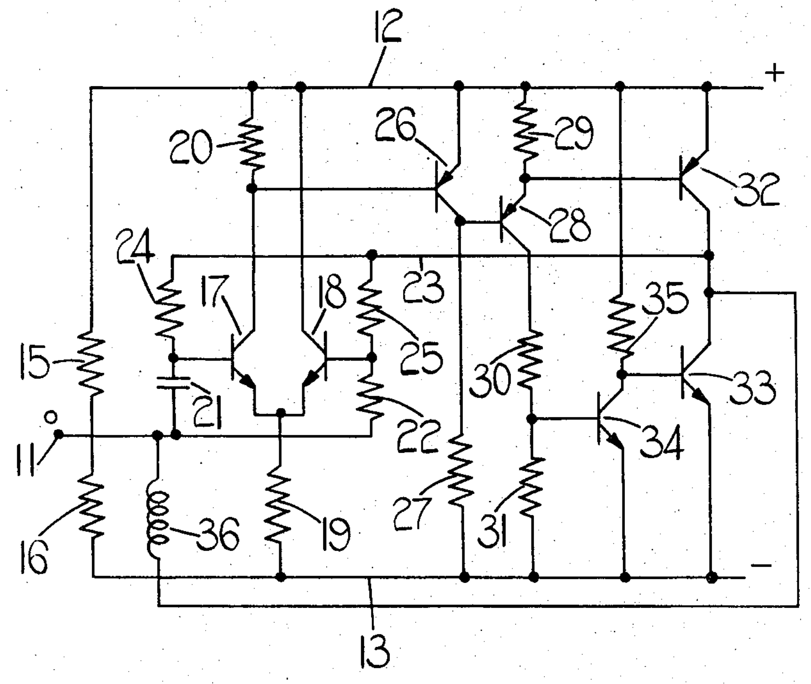
FIG. 7 is a circuit diagram of a square wave oscillator used in FIG. 1.

Referring now to FIG. 7 there are provided two n-p-n transistors 17 and 18 having their emitters interconnected and connected to the supply line 13 by way of a resistor 19. The collector of the transistor 17 is connected to the supply line 12 by way of a resistor 20 and the collector of the transistor 18 is connected directly to the supply line 12. The base of transistor 17 is connected by way of a capacitor 21 to the supply line 11 and the base of the transistor 18 is connected to the line 11 by way of a resistor 22. In addition the bases of the transistors 17 and 18 are connected to a common line 23 by way of resistors 24 and 25 respectively.

The collector of the transistor 17 is connected to the base of a p-n-p transistor 26 having its emitter connected directly to the supply line 12 and its collector connected to the supply line 13 by way of a resistor 27. The collector of the transistor 26 is connected to the base of a further p-n-p transistor 28 and the emitter of the transistor 28 is connected to the supply line 12 by way of a resistor 29. The collector of the transistor 28 is connected to the supply line 13 by way of resistors 30 and 31 in series. Moreover, the emitter of the transistor 28 is connected to the base of a p-n-p transistor 32 which has its emitter connected to the supply line 12 and its collector connected to the collector of an n-p-n transistor 33 having its emitter connected to the supply line 13. The line 23 is connected to the collectors of the transistors 32 and 33. A further n-p-n transistor 34 is provided having its emitter connected to the line 13 and its collector connected to the line 12 by way of a resistor 35. In addition the collector of the transistor 34 is connected to the base of the transistor 33 and the base of the transistor 34 is connected to a point intermediate the resistors 30 and 31. The transistors 32 and 33 are a complementary pair and are selected to have a low saturated voltage drop with a high inverse current gain factor.

The primary winding 36 of the transformer has its ends connected respectively to the supply line 11 and to the line 23.

In operation, assuming that the transistor 17 is in a nonconducting state then the transistor 26 will be turned off and the transistors 18, 28 and 32 turned on. In addition the transistor 34 will be turned on and the transistor 33 will be turned off.

Assuming that transistor 17 has just been turned off, the capacitor 21 will start to charge until a point is reached at which the transistor 17 starts to conduct and when this occurs the transistors 18, 26, 28, 32 33 and 34 will reverse their state, and the transistor 17 is turned on rapidly so that the winding 36 is effectively connected between the supply line 11 and the supply line 13, and reversal of the rate of change of current therein occurs. The capacitor 21 therefore charges in the opposite direction until the base potential of the transistor 17 reaches a value which is determined by the base potential of the transistor 18, which is set by the resistors 25, 22. When this point is reached, the transistor 17 turns off at which point all the transistors reverse their state of conduction, so that the turnoff of the transistor 17 is rapid. The cycle is then repeated. It will be seen therefore that the voltage applied to the ends of the winding 36 is of substantially square wave form and the current flow in the winding 36 will be of saw tooth form. Providing the voltage of the supply line 11 is mid-way between the potentials of the supply lines 12 and 13, and exact square wave voltage will be produced, assuming of course that the emitter-collector voltage drops of the transistors 32 and 33 are equal. In the event that the voltage on the supply line 11 is not half the voltage between the supply lines 12 and 13, or that the transistors 32 and 33 have different collector-emitter volt drops, then a true square wave voltage will not be produced. However, the integral with respect to time of the voltage will be substantially constant and equal to zero, this being ensured by the fact that the capacitor 21 and the resistor 24 which determine the switching time are operative during each half cycle. The change in voltage is determined by the resistors 22, 25. Thus, the unbalance of current in the lines 12 and 13 will be minimised and the mean value of the current in the line 11 and winding 36 will be substantially zero.

While the use of a variable coupling transformer has been described with reference to the transducer which senses the position of the control rod it will be understood that the same form of transducer may be used for providing the demand signal.

The control system is particularly suitable for use with a compression-ignition engine driving a road vehicle, the battery of the vehicle then providing the required power for the system.

What is claimed is:

1. A square wave oscillator which is driven between a first state and a second state and which includes first and second d.c. supply lines, a third supply line which is maintained at a potential between the potential of the first and second supply lines, a resistor-capacitor network, and switch means which when the oscillator is in one state connects the resistor-capacitor network between the third and first supply lines to determine the period for which the oscillator remains in said one state, the switch means serving when the oscillator is driven to its second state to connect the resistor-capacitor network between the third and second supply lines to determine the period for which the oscillator remains in its second state, said resistor-capacitor network being connected between the switch means and the third supply line and including two parallel circuits, one containing a pair of resistors in series, and the other containing a resistor and a capacitor in series, the junction of the pair of resistors, and the junction of the resistor and capacitor, providing two inputs to a comparator which controls the switching means.

2. An oscillator as claimed in claim 1 in which the comparator includes a pair of transistors with their emitters interconnected.

3. An oscillator as claimed in claim 1 in which the third supply line is at a potential mid-way between the potentials of the first and second supply lines.

4. An oscillator as claimed in claim 1 in which the oscillator supplies a signal to the primary winding of a variable coupling transformer, said winding being connected between the switch means and the third supply line.

5. An oscillator as claimed in claim 1 in which the switch means comprises a complementary pair of transistors having low saturated voltage drops and high inverse current gain factors.

* * * * *